(12) United States Patent
Heigl et al.

(10) Patent No.: US 11,940,255 B2
(45) Date of Patent: Mar. 26, 2024

(54) IGNITING UNIT, ESPECIALLY FOR AN INFLATOR, INFLATOR, AIRBAG MODULE, VEHICLE SAFETY SYSTEM AND METHOD OF MANUFACTURING AN IGNITING UNIT

(71) Applicant: TRW Airbag Systems GmbH, Aschau am Inn (DE)

(72) Inventors: Stefan Heigl, Muhldorf (DE); Johann Hinkofer, Ampfing (DE); Christoph Knollhuber, St. Wolfgang (DE); Christoph Mocker, Mühldodrf (DE); Andreas Seidel, Haag (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 332 days.

(21) Appl. No.: 16/697,319

(22) Filed: Nov. 27, 2019

(65) Prior Publication Data
US 2020/0103207 A1   Apr. 2, 2020

Related U.S. Application Data

(62) Division of application No. 14/499,322, filed on Sep. 29, 2014, now abandoned.

(30) Foreign Application Priority Data

Oct. 21, 2013   (DE) .......................... 102013017383.3

(51) Int. Cl.
*F42B 3/12*   (2006.01)
*B60R 21/26*   (2011.01)
(Continued)

(52) U.S. Cl.
CPC ............... *F42B 3/12* (2013.01); *B60R 21/26* (2013.01); *B60R 21/264* (2013.01); *F42B 3/10* (2013.01);
(Continued)

(58) Field of Classification Search
CPC .... F42B 3/10; F42B 3/103; F42B 3/12; F42B 3/18; F42B 3/125; F42B 3/128;
(Continued)

(56) References Cited

U.S. PATENT DOCUMENTS

| 3,831,523 | A | * | 8/1974 | Thomas | ..................... F42B 3/18 |
| | | | | | 102/202.1 |
| 4,011,115 | A | * | 3/1977 | Harris | ..................... F42B 3/128 |
| | | | | | 149/24 |

(Continued)

FOREIGN PATENT DOCUMENTS

| CN | 1616914 A | * | 5/2005 | ........... B60R 21/017 |
| CN | 102092356 | | 6/2011 | |

(Continued)

OTHER PUBLICATIONS

Li Chang, Du Zhiming, "Progress in Cooling Technology for Pyrotechnic Gas Generator", Energetic Materials, vol. 12, Issue 5, pp. 309-313 (Year: 2004).*

(Continued)

*Primary Examiner* — James S Bergin
(74) *Attorney, Agent, or Firm* — TAROLLI, SUNDHEIM, COVELL & TUMMINO L.L.P.

(57) ABSTRACT

The invention relates to an igniting unit (10), especially for an inflator, comprising an electric igniter (11) including a first inner cap (12) which forms a space (14) for being filled with a booster propellant charge with a second outer cap (13). In accordance with the invention, the second cap (13) is an electrically non-conductive insulating cap.

16 Claims, 2 Drawing Sheets

(51) Int. Cl.
*B60R 21/264* (2006.01)
*F42B 3/10* (2006.01)
*F42B 3/195* (2006.01)
*B29C 45/14* (2006.01)
*B29C 65/08* (2006.01)
*B29C 65/16* (2006.01)
*B29L 31/34* (2006.01)

(52) U.S. Cl.
CPC ............. *F42B 3/128* (2013.01); *F42B 3/195* (2013.01); *B29C 45/14336* (2013.01); *B29C 65/08* (2013.01); *B29C 65/16* (2013.01); *B29L 2031/3481* (2013.01); *B60R 2021/26029* (2013.01); *B60R 2021/26052* (2013.01); *F42B 3/125* (2013.01); *Y10T 156/10* (2015.01)

(58) Field of Classification Search
CPC ....... F42B 3/195; B60R 21/26; B60R 21/264; B60R 2021/26029
USPC ..... 102/202.5, 202.7, 202.9, 202.14, 275.11, 102/530, 531; 280/736, 741
See application file for complete search history.

(56) References Cited

U.S. PATENT DOCUMENTS

| | | | |
|---|---|---|---|
| 5,140,906 A | 8/1992 | Little, II | |
| 5,142,982 A | 9/1992 | Diepold et al. | |
| 5,621,183 A | 4/1997 | Bailey | |
| 5,845,578 A | 12/1998 | Fogle, Jr. | |
| 6,009,809 A | 1/2000 | Whang | |
| 6,634,299 B2 * | 10/2003 | Vetter | F42B 3/26 280/743.1 |
| 6,666,721 B1 | 12/2003 | Jakob et al. | |
| 7,343,859 B2 | 3/2008 | Matsuda et al. | |
| 2002/0145275 A1 | 10/2002 | Hosey et al. | |
| 2005/0155509 A1 | 7/2005 | Matsuda et al. | |
| 2005/0188875 A1 | 9/2005 | Matsuda et al. | |
| 2006/0150855 A1 | 7/2006 | Maruyama et al. | |
| 2015/0107477 A1 * | 4/2015 | Heigl | B60R 21/264 156/60 |

FOREIGN PATENT DOCUMENTS

| | | | | |
|---|---|---|---|---|
| DE | 23018387 | | 2/2004 | |
| DE | 102007057551 | | 6/2009 | |
| EP | 2589920 | | 5/2013 | |
| GB | 431950 A | * | 7/1965 | ............. F42B 3/128 |

OTHER PUBLICATIONS

Machine translation of CN-102092356-A (Year: 2011).*
Search Report in CN 2014105591864 (Year: 2017).*
First Office Action in CN 201810791270 (Year: 2020).*
Search Report in CN 201810791270 (Year: 2020).*

* cited by examiner

IGNITING UNIT, ESPECIALLY FOR AN INFLATOR, INFLATOR, AIRBAG MODULE, VEHICLE SAFETY SYSTEM AND METHOD OF MANUFACTURING AN IGNITING UNIT

RELATED APPLICATION

This application is a divisional of U.S. patent application Ser. No. 14/499,322, filed on Sep. 29, 2014, the disclosure of which is hereby incorporated by reference in its entirety.

BACKGROUND OF THE INVENTION

The invention relates to an igniting unit, especially for an inflator, comprising an electric igniter having a first inner cap which forms a space for being filled with a booster propellant charge with a second outer cap. Apart from this, the invention relates to an inflator, an airbag module and a vehicle safety system. Moreover, the invention relates to a method of manufacturing an igniting unit.

Occupant restraint systems for motor vehicles usually include airbag modules comprising an airbag which is inflated in the case of crash so as to reduce the probability of a collision of body parts of a vehicle occupant with a vehicle component. For inflating the airbag in the case of crash usually inflators comprising a combustion chamber which is filled with solid propellant and has a discharge end are provided. Inflators include at least one igniting unit for igniting the solid propellant, for example. It is well-known to fill so called GTMS (glass to metal seal) standard igniters with pyrotechnical means, wherein the required contact between the pyrotechnical means and a bridge wire intended to ignite the pyrotechnical means can be ensured in the case of higher filling amounts of the pyrotechnical means, especially starting from a filling amount of approx. 400-500 mg, only with great effort.

SUMMARY OF THE INVENTION

It is the object of the present invention to further develop an igniting unit with pyrotechnical filling. Moreover, it is the object of the invention to provide an inflator, an airbag module and a vehicle safety system including such igniting unit. It is also an object of the invention to provide a method of manufacturing such igniting unit.

In accordance with the invention, concerning the further developed igniting unit this object is achieved by the subject matter of claim 1.

Accordingly, the invention is based on the idea to provide an igniting unit, especially for an inflator, wherein an electric igniter has a first inner cap which delimits a space for being filled with a booster propellant charge with a second outer cap. In accordance with the invention, the second cap is an electrically non-conductive insulating cap.

In other words, the igniting unit consists of an electric igniter and a second or additional cap, wherein the first cap of the electric igniter and the second additional cap delimit a space or a chamber, resp., adapted to be filled with a booster propellant charge. The booster propellant charge can also be referred to as booster charge. For example, it can be igniter propellants such as ZPP (zirconium potassium perchlorate) and/or THPP (titanium hydride potassium perchlorate).

According to the invention, electric standard igniters are thus provided with an additional cap so that between the first cap pertaining to the electric standard igniter and the second additional cap an appropriate space for being filled with a booster propellant charge can be formed, the second or additional cap being in the form of an electric insulating cap.

The electric standard igniters may be so called GTMS (glass to metal seal) or PTMS (plastic to metal seal) igniters. The cap of the electric igniter, i.e. the first inner cap of the igniting unit, can be made of metal and/or plastic material.

The second outer, i.e. additional cap is an electrically non-conductive insulating cap. Preferably this second cap is made of plastic material at least in portions, but in portions it could as well be made of metal.

Due to the configuration of the second cap as electrically non-conductive insulating cap in the form of an outer cap of the igniting unit, in the mounted state of the igniter in an inflator the igniting unit and components surrounding the igniter, respectively, which might contact the second cap or outer cap are prevented from making an electrically conductive connection to the igniting unit or the igniter, respectively. The electric potential of the vehicle mass otherwise would be laid directly onto the second cap or outer cap so that triggering of the igniter or the igniting unit might be impaired.

The second cap or outer cap can have a cylindrical, especially circular-cylindrical peripheral wall, for example, said cylindrical peripheral wall including an orifice on at least one longitudinal side. The orifice width and the diameter of the second cap can be larger than the outer dimensions of the first cap. The first cap, too, can have a cylindrical or circular-cylindrical peripheral wall, the outer diameter and the outer cross-section of the first cap, resp., being smaller than the inner diameter and the orifice width, resp., of the second cap so that the first cap may project into a space formed by the peripheral wall and an end wall or a cover of the second cap. In other words, the first cap and the second cap have inner and outer dimensions so that the second cap can be put over the first cap or the first cap can be press-fitted into the second cap.

The second cap forms a space for being filled with a booster propellant charge with the first cap. In other words, the first cap delimits such space together with the second cap. The space is delimited and formed, resp., especially by the side wall or peripheral wall of the second cap, the end wall or the cover surface of the second cap as well as the end wall or the cover surface, resp., of the first cap.

In accordance with the invention, the second cap is connected to the electric igniter by plastic insert molding. In other words, by an insert molding process a plastic base is formed which connects the second cap to the electric igniter. This embodiment is especially advantageous, when the electric igniter is an afore-mentioned GTMS (glass to metal seal) igniter.

The second cap can be connected to the electric igniter by material connection, especially by laser or ultrasonic welding, or by positive and/or friction-type connection, especially by press-fitting or adhesive bonding. This embodiment is especially advantageous when the electric igniter is an afore-mentioned PTMS (plastic to metal seal) igniter.

The space formed or the chamber, resp., is filled with 30 to 1500 mg, especially with 200 to 1200 mg, especially 300 to 1000 mg, in particular 350 to 500 mg of booster propellant charge or booster charge. Accordingly, with the help of the igniting unit according to the invention a large amount of booster charge can be made available, wherein the contact between the bridge wire of the electric igniter and the pyrotechnics of the electric igniter is not affected. The pyrotechnical charge of the electric igniter is merely provided in a space that is formed or delimited with the aid of the first cap of the electric igniter. The booster charge therefore is separated from the pyrotechnical charge of the electric igniter. The first cap of the electric igniter therefore separates the booster charge of the igniting unit from the pyrotechnical charge of the electric igniter. With the aid of the igniting unit according to the invention, also chemically incompatible booster and pyrotechnical charges can be kept separately from each other.

Moreover, it is also possible to add into the space formed for the booster propellant charge in addition to the pyrotechnically activatable booster charge a substantially inert material or a material decelerating combustion, for example in the form of a separate layer including such inert material or by means of individual molds thereof. This inert material can have a cooling effect during combustion of the pyrotechnical components of the igniting unit so that the temperature generated in total by the igniting unit can be reduced for particular applications. It is also imaginable that in the space originally formed for the booster propellant charge solely only such inert material is provided, i.e. no more pyrotechnical booster charge is taken up. In this case a cooling effect for the pyrotechnical charge of the electric igniter is desired. Borates, boric oxides, calcium carbonate, molecular sieves, silicates as well as mixtures of groups consisting of said materials are taken into account as such inert material.

It is another advantage concerning the igniting unit design according to the invention that the ignition can be configured to be not only directed forward but also spherical. In other words, the efficient direction for ignition of a solid propellant in a combustion chamber of an inflator by the igniting unit design according to the invention cannot only take place in the axial longitudinal direction but also in the radial direction. As mentioned already, variable filling of the igniting unit is possible, as the contact of pyrotechnical charge of the electric igniter with the bridge wire thereof is provided independently of the filling of the space with a booster propellant charge.

Moreover, an auto-ignition function outside the electric standard igniter can be integrated. This means that in the space containing the booster propellant charge also an advanced igniting means, for example by means of an inserted advanced ignition tablet including a known advanced ignition means can be accommodated without said advanced ignition means having to be integrated in the pre-fabricated standard igniter. Such advanced ignition means can be required to stand a so called "bonfire test" as qualification feature for an igniting unit and, respectively, for an entire inflator.

As regards an inflator, the object is achieved by the features of claim 6. Such inflator according to the invention thus includes an igniting unit according to the invention.

As regards an airbag module, the object is achieved by the features of claim 7. Consequently, an airbag module includes an igniting unit according to the invention and/or an inflator according to the invention.

As regards a vehicle safety system, the object is achieved by the features of claim 8. Accordingly, the vehicle safety system includes an igniting unit according to the invention and/or an inflator according to the invention and/or an airbag module according to the invention. The vehicle safety system can be a vehicle occupant restraint system, for example an airbag and/or a seat belt. Hence the igniting unit can be used, for instance, within the scope of a belt tensioning system. Equally, the vehicle safety system can be a further comprehensive personal safety system, for example for persons who may collide with the vehicle. In this case, especially the design of a hood stay system in which the igniting unit initiates a stroke movement of a piston preferably guided in a cylinder is mentioned, thereby the hood of the vehicle being lifted so as to form an extended crush zone for a person colliding with the vehicle. Also personal safety systems which can be worn by a person to be protected and can be integrated in clothes, for example, including inflatable means such as an inflatable airbag helmet for cyclists or outer clothing for bikers, are an imaginable application.

As regards a method of manufacturing an igniting unit, the object is achieved by the features of claim 9 and/or 11. Accordingly, in a first step the second cap in the form of an outer cap is filled with the booster propellant charge. Subsequently, the prefabricated electric igniter is press-fitted into the second cap such that the first cap of the electric igniter and the second cap form a space which is filled with the booster propellant charge. After that, the outer cap is connected to the electric igniter. Here different connecting methods can be applied.

When the electric igniter is a GMTS (glass to metal seal) igniter, the outer cap can be connected to the electric igniter preferably by plastic insert molding. In other words, the second cap is first filled with the booster propellant charge or booster charge, resp., so that in a second step the electric igniter can be press-fitted into the filled second cap. Press-fit of the first cap within the second cap is brought about so that plastic material can subsequently be injection-molded around the second cap.

By plastic insert molding a plastic base is formed to connect the outer cap or second cap, resp., to the electric igniter. The booster charge can be pellets or tablets, for example, which can be filled into the second cap or into the outer cap in a simple manner.

When the electric igniter is a PTMS (plastic to metal seal) igniter, the outer cap can be connected to the electric igniter preferably either by material connection, by laser or ultrasonic welding, in that the outer cap is laser-welded or ultrasonic-welded at least in portions to the first cap of the electric igniter. Alternatively to this, the connection of the outer cap to the electric PTMS igniter can also be a positive and/or friction-type connection. A robust press-fit connection can be obtained already in that the prefabricated electric igniter is press-fitted into the outer cap as described already in the foregoing. In addition or alternatively, the outer cap can also be bonded to the cap of the electric PTMS igniter by an adhesive in the contact area.

BRIEF DESCRIPTION OF THE DRAWINGS

Hereinafter the invention shall be illustrated by way of embodiments with reference to the enclosed schematic Figures in which.

DESCRIPTION

Figure 1:
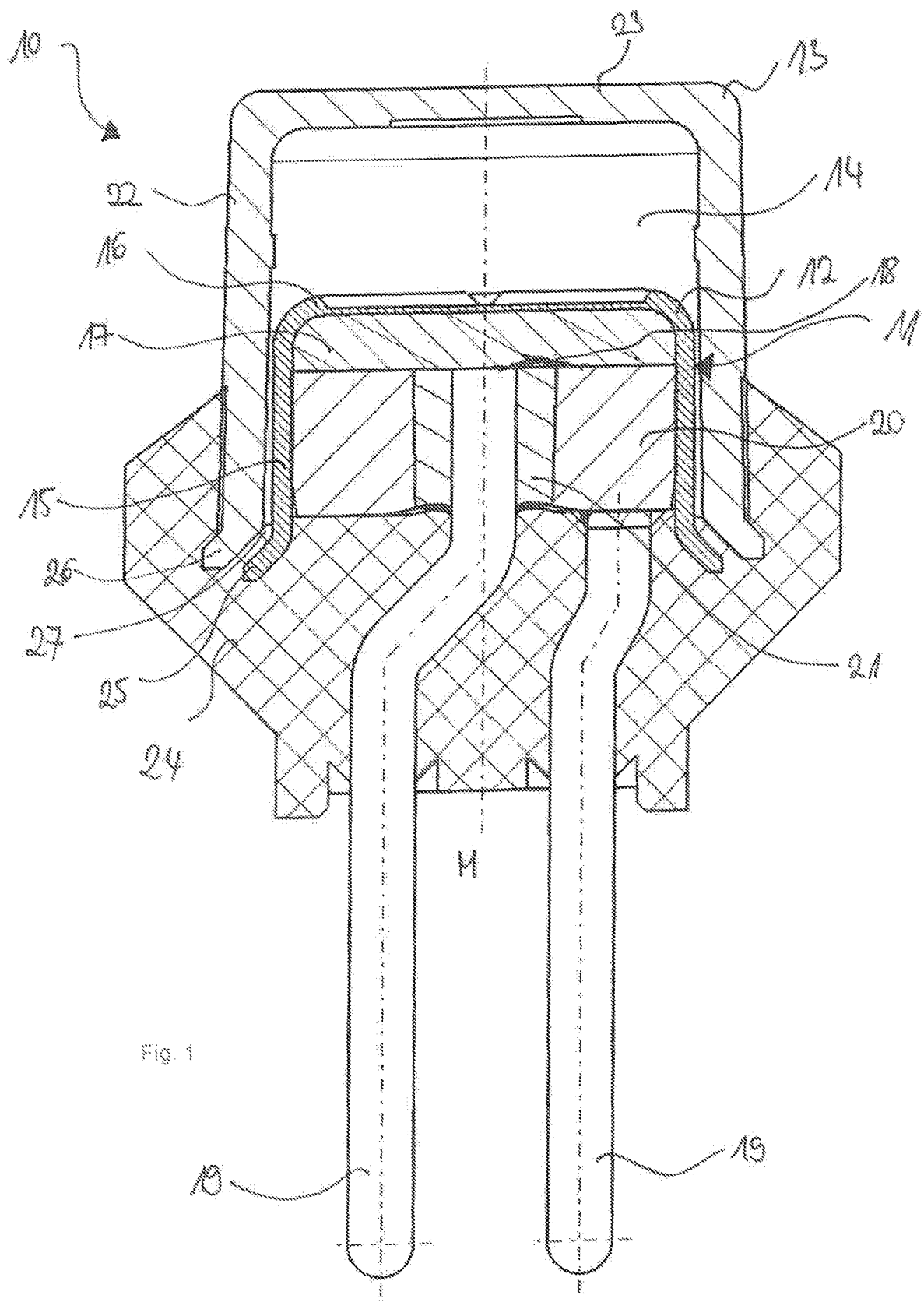
FIG. 1: shows a longitudinal sectional view across an igniter unit comprising a GTMS (glass to metal seal) igniter.

FIG. 1 illustrates an igniting unit 10, especially for an inflator (not shown), an electric igniter 11 including a first cap 12 which delimits a space 14 for being filled with a booster propellant charge with a second cap 13. According to the invention, the second cap 13 is in the form of an electrically non-conductive insulating cap.

The electric igniter 11 can be an electrically/pyrotechnically prefabricated standard igniter. So called GTMS (glass to metal seal) standard igniters and PTMS (plastic to metal seal) standard igniters are known. FIG. 1 includes an electric igniter of the "GTMS standard igniter" type. The electric igniter 11 includes a cap 12 which may be manufactured of metal and/or plastic. The first cap 12 comprises a side or peripheral wall 15 and a cover 16. The cover 16 is in the form of a flat end wall. The peripheral wall 15, on the other hand, has a rotation-cylindrical, especially circular-cylindrical shape. The cover 16 as well as the upper third of the peripheral wall 15 of the first cap delimit a space 17 filled with pyrotechnical charge, wherein also plural beds/layers of pyrotechnics are possible. There is equally provided an electrically conductive bridge wire 18 projecting into the space 17 and into the pyrotechnical charge, respectively. The bridge wire is connected, preferably welded, to the two pins 19 in an electrically conductive manner. With the aid of a metallic ring 20 and a pressure glazing 21 the pins 19 are connected to the first cap 12 of the electric igniter 11.

Summing up, the first cap 12, the space 17 filled with pyrotechnics, the bridge wire 18, the pins 19 as well as the metallic ring 20 and the pressure glazing 21 form the electric igniter 11. This electric igniter 11 is a prefabricated known GTMS standard igniter, as mentioned already.

The second cap 13 which is formed as electric insulating cap and is preferably made of plastic material, but which could also be made of metal, forms the outer cap of the igniting unit 10. The outer cap or second cap 13 in turn comprises a peripheral wall 22, which in the shown example is circular-cylindrical, as well as a cover 23 which is a substantially flat end wall. An orifice 27 into which the electric igniter 11 and the first cap 12 of the electric igniter 11, resp., projects is formed on the side of the second cap 13 opposed to the cover 23.

Opposed to the cover 23 of the second cap 13 the orifice 27 is formed. The inner diameter or the opening width of the peripheral wall 22 of the second cap 13 is larger than the outer diameter of the peripheral wall 15 of the first cap 12 so that the electric igniter 11 and the first cap 12 of the electric igniter 11, resp., can be inserted or press-fitted into the orifice 27 of the second cap 13.

Both caps 12 and 13 are formed to be preferably rotationally symmetric relative to the central axis M. Furthermore, the first cap 12 of the electric igniter 11 is formed concentrically with respect to the central axis M and to the second cap 13.

The space 14 for being filled with a booster propellant charge or booster charge, resp., is thus delimited or formed by the first cap 12 and the second cap 13. Especially the space 14 is formed by the cover 16 of the first cap 12 as well as the cover 23 and the peripheral 22 of the second cap.

In particular it is not provided that parts of the booster propellant charge are provided between the peripheral wall 22 of the second cap 13 and the peripheral wall 15 of the first cap 12 in the area in which the two caps 12, 13 are press-fitted into each other. In other words, in this area there is provided no gap, at least no such gap into which parts of the propellant charge might get. Due to the strongly enlarged representation of FIG. 1 this could be interpreted in a misleading manner. Consequently, the outer diameter of the peripheral wall 15 of the first cap 12 is smaller only to such extent, compared to the inner diameter of the peripheral wall 22 of the second cap 13, that the two caps 12, 13 can be easily pressed into each other in terms of process.

The space 14 is configured so that it can be filled with 30 to 1500 mg, especially 200 to 1200 mg, especially 300 to 1000 mg, in particular 350 to 500 mg of booster propellant charge.

During manufacture of the igniting unit 10 according to the invention, first the second cap 13 made of plastic which is formed as outer cap is filled with the booster charge. After that the electric igniter 11, especially the first cap 12 of the electric igniter 11 is press-fitted into the second cap 13 and the orifice 27 of the second cap 13, resp., so that the first cap 12 and the second cap 13 form the space 14 which is already filled with the booster propellant charge. Subsequently, the plastic cap 13 is connected to the electric igniter 11 by plastic insert molding.

A plastic base 24 connecting the outer cap or second cap 13 to the electric igniter 11 is formed by plastic insert molding. The first cap 12 includes an inclined end flange 25. The second cap 13 also includes such inclined end flange 26. During plastic insert molding plastic material flows into the clearance formed by the two end flanges 25 and 26 so that a proper connection of the outer plastic cap 13 to the electric igniter 11 is provided.

When the second cap 13 is made of plastic and is connected to the electric igniter 11 with the aid of plastic insert molding and consequently the plastic base 24 is formed, the igniting unit 10 is configured to be electrically insulated, i.e. electrically non-conductive, with the exception of the two electrically conductive pins 19.

Figure 2:
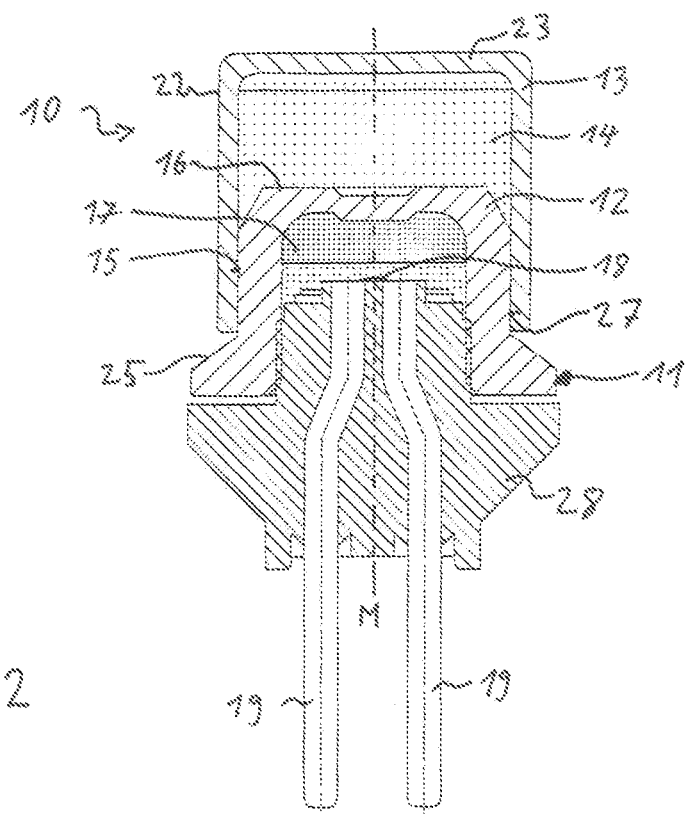
FIG. 2: shows a longitudinal sectional view across an igniter unit comprising a PTMS (plastic to metal seal) igniter.
Figure 3:
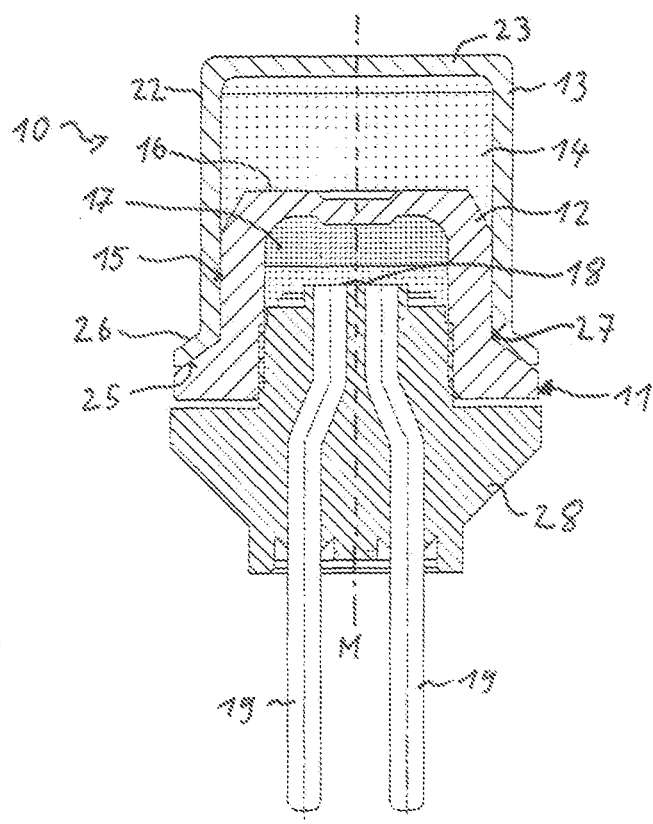
FIG. 3: shows a longitudinal sectional view across another embodiment of an igniter unit comprising a PTMS (plastic to metal seal) igniter.

Each of the FIGS. 2 and 3 shows an igniting unit 10, especially for an inflator (not shown) which substantially corresponds to the structure of FIG. 1, but especially comprises an electric igniter 11 of the PTMS (plastic to metal seal) type standard igniter described in the foregoing. The individual components of the igniting units 10 of the FIGS. 2 and 3 having the same function as those of FIG. 1 are provided with identical reference numerals and the description of figures of FIG. 1 is referred to in this respect.

Especially the following substantial differences are resulting for the FIGS. 2 and 3 compared to FIG. 1:

In the electric igniter 11 (PTMS standard igniter) in FIGS. 2 and 3 the first cap 12 is substantially made completely of plastic and not of metal. The restriction "substantially" has to be understood to the effect that the first cap 12 may be made of a plastic material which is merely doped with minimal metallic particles so as to meet particular requirements concerning electrostatics and electrostatic discharges, however no large-surface continuous metallic areas on or in the first cap 12 are meant in this case.

Another crucial difference consists in the fact that the two electrically conductive pins 19 in FIGS. 2 and 3 are not connected to a metal ring or fastened in a pressure glazing, i.e. they are not connected to the first cap of the electric igniters with the aid of a metal ring as well as a pressure glazing. Rather, in each of the FIGS. 2 and 3 both pins 19 are embedded in a plastic body 28 or a surrounded by the same by injection-molding. The plastic body 28 is configured so that in the area opposite to the bridge wire 18 it has a pre-shaped conical geometry that is advantageous to the further mounting of the igniting unit 10, e.g. in an inflator.

In contrast to this, in FIG. 1 the plastic base 24 of the igniting unit 10 must first be manufactured, in addition to the electric igniter 11 there, by a separate plastic insert molding process.

The plastic body 28 of the FIGS. 2 and 3 is connected to the first cap 12, especially by ultrasonic welding, and together with the latter forms an enclosing outer housing of the prefabricated electric igniter 11, wherein, as aforedescribed, the two pins 19 are embedded in the plastic body and extend across the same in parallel to the central axis M. Further in the inner space 17 of the electric igniter 11 two beds or layers of pyrotechnics are shown which are also referred to as primary and secondary charges and may have different chemical compositions.

When manufacturing the igniting unit 10 according to the invention of FIGS. 2 and 3, analogously to FIG. 1 first the second cap 13 in the form of an outer cap is filled with the booster charge. Subsequently the electric igniter 11, especially the first cap 12 of the electric igniter 11 is press-fitted into the second cap 13 and the orifice 27 of the second cap 13, resp., so that the first cap 12 and the second cap 13 form the space 14 which is filled already with the booster propellant charge.

By such pressing operation the second cap 13 is already connected to the electric igniter 11. Finally the cap 13 can be further connected to the igniter 11 by material connection by laser or ultrasonic welding. Concerning the afore-mentioned pressing operation also a parallel or subsequent bonding process is imaginable.

FIGS. 2 and 3 differ by the illustrated form of the second cap 13 which in FIG. 3 includes an inclined end flange 26 that is adjacent to a complementary inclined end flange 25 of the first cap 12 of the electric igniter 11.

Hereby, when further mounting the igniting unit 10 of FIG. 3 for example into a retaining component (not shown), a beading connection can be provided by beading an area of the retaining component which exerts a retaining force on the inclined end flange 26, the retaining force causing sufficient force connection of the end flange 26 to the end flange 25. Thus the afore-mentioned laser or ultrasonic welding process for connecting the second cap 13 to the first cap 12 might be dispensed with, where appropriate.

The inflators, airbag modules and vehicle safety systems according to the invention are provided with igniting units 10 according to the invention in accordance with the embodiment shown in FIGS. 1 to 3.

LIST OF REFERENCE NUMERALS 10 igniting unit
11 electric igniter
12 first cap
13 second cap
14 space
15 peripheral wall
16 cover
17 space
18 bridge wire
19 pin
20 metallic ring
21 pressure glazing
22 peripheral wall
23 cover
24 plastic base
25 inclined end flange
26 inclined end flange
27 orifice
28 plastic body
M central axis

The invention claimed is:

1. An igniting unit for an inflator, comprising:
   an electric igniter comprising a first inner cap with a first space filled with a pyrotechnical charge that produces combustion products in response to actuation of the igniter;
   a second outer cap, wherein the first inner cap forms a second space with the second outer cap; and
   an inert material provided in the second space and configured to provide a cooling effect to the combustion products of the pyrotechnical charge.

2. The igniting unit according to claim 1, wherein the inert material is the sole material provided in the second space.

3. The igniting unit according to claim 1, further comprising a pyrotechnically activatable booster propellant charge that is provided in the second space in addition to the inert material, wherein the booster material produces combustion products in response to actuation of the igniter, and the inert material is further configured to provide a cooling effect to the combustion products of the booster material.

4. The igniting unit according to claim 1, wherein the inert material is selected from the group consisting of Borates, boric oxides, calcium carbonate, molecular sieves, silicates, and mixtures thereof.

5. The igniting unit according to claim 1, wherein the electric igniter is a prefabricated igniter comprising a bridge wire connected to two pins in an electrically conductive manner, wherein the electric igniter is a PTMS (plastic to metal seal) igniter comprising a plastic body in which the two pins are embedded whereby the plastic body is connected to the first inner cap.

6. The igniting unit according to claim 1, wherein the second cap comprises an electrically non-conductive insulating cap connected to the electric igniter by plastic insert molding.

7. The igniting unit according to claim 6, wherein the second cap is connected to the electric igniter by plastic insert molding.

8. The igniting unit according to claim 1, wherein the second cap is made, at least in portions, of a plastic material or a metal material.

9. The igniting unit according to claim 8, wherein the second cap is connected to the electric igniter by a material connection comprising at least one of laser welding, ultrasonic welding, a positive (interference) connection, a friction-type connection, press-fitting, and adhesive bonding.

10. An inflator comprising an igniting unit according to claim 1.

11. An airbag module comprising an inflator according to claim 10.

12. A vehicle safety system comprising an inflator of claim 10.

13. An airbag module comprising an igniting unit according to claim 1.

14. A vehicle safety system comprising an airbag module according to claim 13.

15. A vehicle safety system comprising an igniting unit of claim 1.

16. The igniting unit of claim 1, wherein the inert material is configured to reduce the temperature generated in total by the ignition unit.

* * * * *